Patented Apr. 29, 1952

2,595,159

UNITED STATES PATENT OFFICE 2,595,159

PREPARATION OF VITAMIN $B_{12}$ CONCENTRATES FROM STREPTOMYCES GRISEUS CULTURES

Curtis E. Meyer and William H. De Vries, Kalamazoo, Mich., assignors to The Upjohn Company, Kalamazoo, Mich., a corporation of Michigan No Drawing. Application February 25, 1949, Serial No. 78,458

13 Claims. (Cl. 167—81)

This invention relates to a method for the separation of a vitamin concentrate from cultures of the organisms of the genus Streptomyces, and specificially to concentrates characterized by vitamin $B_{12}$ activity.

It is an object of the present invention to provide a process for the recovery of substances possessing vitamin $B_{12}$ activity which have been discovered among the products of the culture of organisms of the genus Streptomyces and, in particular, the streptomycin-producing organism *Streptomyces griseus*. It is a further object of the present invention to provide a simple and economical process for the extraction and production of vitamin-rich concentrates from such cultures and fermentation products. Other objects and advantages of the invention, some of which are referred to specifically hereinafter, will be apparent to those skilled in the art to which the invention pertains.

The present invention provides a process for the recovery from Streptomyces cultures of substances possessing vitamin $B_{12}$ activity together with any streptomycin and the ketonic antibiotic, cycloheximide. Streptomyces may be cultured on nutrient medium to produce vitamin $B_{12}$ without the production of streptomycin or cycloheximide; although this invention will be particularly described for those fermentation conditions which produce streptomycin and cycloheximide, they are not critical to the method of this invention.

It is known that culture of the organism *Streptomyces griseus* on a suitable nutrient medium produces streptomycin (Selman A. Waksman and Albert Schatz, U. S. Patent 2,449,866) and a neutral ketonic antibiotic (A. J. Whiffen, N. Bohonos and R. L. Emerson, J. Bact., 1946, vol. 52, page 610). It has now been found that substances having vitamin $B_{12}$ activity are produced at the same time and can be separated from other fermentation products by the methods of this invention. So far as is now known, those conditions which are favorable to the production of streptomycin and the neutral antibiotic of Whiffen, Bohonos and Emerson, herein designated by the generic name cycloheximide, are also suitable for the production of vitamin $B_{12}$ or substances having vitamin $B_{12}$ activity. It has been found further that the substances having vitamin $B_{12}$ activity that are produced as a result of the culture of *Streptomyces griseus* on a suitable nutrient medium are normally associated with the mycelium of the organism, rather than with the streptomycin or the fermentation broth. Accordingly, if the mycelium is separated from the culture medium as herein described, only small quantities of substances having vitamin $B_{12}$ activity will be found in the medium which contains the streptomycin. However, the separation of the mycelium from the culture medium, by conventional methods for the isolation of streptomycin, which includes acidification to a pH more acid than 3.0 prior to the removal of the mycelium, causes lysis of mycelium so that some of the vitamin $B_{12}$ activity appears in the culture medium along with the streptomycin. The bulk of the vitamin $B_{12}$ activity, however, remains on the filter cake where it is associated with the cycloheximide of Whiffen, Bohonos and Emerson.

In accordance with the process of our invention, the cycloheximide remaining on the filter cake together with the mycelium is preferably removed by elution with aqueous 80 percent acetone, according to the method of Ford and Leach (J. Am. Chem. Soc., 1948, vol. 70, page 1223), which removes the bulk of the cycloheximide but does not extract significant or substantial amounts of the substances possessing vitamin $B_{12}$ activity. The vitamin $B_{12}$ activity can be removed subsequently from the filter cake by elution with aqueous solutions of water-miscible alcohols and ketones such as methanol, ethanol, isopropanol, acetone and methyl ethyl ketone at a pH between 6 and 10, the preferred solvent being 60 to 40 percent aqueous acetone (containing 40 to 60 percent water). The aqueous solvent can be adjusted to the desired pH with water-soluble alkaline reagents such as sodium hydroxide, potassium hydroxide, sodium carbonate, sodium bicarbonate, ammonia or an amine; the preferred alkalies are ammonia and volatile amines. Sufficient acid remains on the filter cake from the prior acidification step (for recovery of streptomycin) so that the pH of the eluting solvent would be more acid than pH 6.0 if an alkali was not added.

A preferred procedure comprises the elution of the filter cake after removal of the cycloheximide with several portions of 50 percent aqueous acetone at a pH within the range of 6.0 to 9.5. There are thus obtained, as described in Example 2 hereinafter, successive eluates containing 2,390,000 m./2 units in 144 grams of solids; 2,100,000 m./2 units in 50.4 grams of solids; 1,160,000 m./2 units in 68 grams of solids; and 480,000 m./2 units in 40.6 grams of solids, respectively, of vitamin $B_{12}$. While the vitamin $B_{12}$ in these eluates is sufficiently concentrated and free from harmful impurities to be suitable for oral therapeutic uses, especially in animal nutrition, their preferred use is as a starting concentrate to be subjected to further purification.

The conventional procedure for the separation of streptomycin from a *Streptomyces griseus* fermentation broth involves an acidification of the broth to a pH of approximately 3, which causes lysis of the organism and the appearance of substances possessing vitamin $B_{12}$ activity in the filtrate. This may be avoided, in accordance with the process of our invention, by filtering the fermentation broth in the presence of a filter aid at the usual end pH of a *Streptomyces griseus* fermentation for the production of sterptomycin, which is approximately 6.0 to 6.5, or preferably at a pH between 5.0 and 6.0. The vitamin $B_{12}$ activity, which is associated with the mycelium, is then extracted at a temperature of 50 to 110 degrees centigrade with water having a pH more acid than 9.5. The use of a solution more alkaline than pH 9.5 for extracting at temperatures from 50 to 110 degrees centigrade is not desirable as it causes destruction and loss of vitamin $B_{12}$ activity. This procedure (filtration prior to lysis) has the added advantages of removing the streptomycin and cycloheximide in the beer so that little of either have to be removed in subsequent purification procedures. When the pH of the water is more acid than about 4.0 the acid causes lysis of the microorganism and the vitamin $B_{12}$ can then be extracted with water at room temperature. The vitamin $B_{12}$ obtained by the extraction of the mycelial cake with water at a temperature of from 50 to 110 degrees centigrade contains 11.6 to 29 milligammas of vitamin $B_{12}$ per milligram of solids, while that obtained by extraction at pH 1.5 for thirty minutes at room temperature contains 4.35 to 11 milligammas of vitamin $B_{12}$ per milligram of solids.

When a *Streptomyces griseus* fermentation broth is treated in conventional manner by adjusting the pH to 2.8 and filtering in the presence of activated carbon and a filter aid, a portion of the vitamin $B_{12}$ activity appears in the filtrate, as mentioned hereinbefore. One method of treating the filtrate in accordance with our invention to effect preliminary isolation of streptomycin, comprises adjusting the pH of the broth to about 8.0, clarifying if necessary by filtration, adding an activated charcoal, filtering, washing the carbon cake with water and eluting the streptomycin therefrom with 1 to 5 percent aqueous acetone at a pH of approximately 2.0. The streptomycin is thus removed by the elution and the vitamin $B_{12}$ remains on the activated carbon, from which it is removed by elution with aqueous water-soluble alcohols and ketones at a pH of 6 to 10 as hereinbefore described. The elution is preferably effected stepwise and the various fractions may be further treated separately or are preferably combined for further treatment. From the filtrate obtained from the fermentation hereinbefore described, a total of 2,698,000 milligammas of vitamin $B_{12}$ in 362.2 grams of solids was obtained. This material is a suitable raw material for the production of preparations possessing vitamin $B_{12}$ activity.

Although the material referred to herein as vitamin $B_{12}$ or as substances possessing vitamin $B_{12}$ activity is believed to be identical with the crystalline LLD factor (growth activity for *Lactobacillus lactis* Dorner) designated by this term by Edward L. Ricks et al. (Science, April 16, 1948, vol. 107, page 396), the concentrates obtained by us may not contain the identical substance. The concentrates obtained in accordance with the process of our invention have been assayed in accordance with recognized methods for the assay of LLD factor, namely, the method of William Shive, J. M. Ravel and R. E. Eakin (J. Am. Chem. Soc., 1948 vol. 70, page 2614). The potency of the vitamin $B_{12}$ concentrates is expressed herein in half-maximal growth units (m./2) or in milligammas. To convert half-maximal growth units to milligammas, the half-maximal units are multiplied by a factor within the range between 2 and 5, which is dependent upon the assay conditions. Crystalline vitamin $B_{12}$ has a potency of approximately 11,000,000 LLD units per milligram, and 0.000013 microgram per milliliter of the culture medium used by Rickes et al. is capable of supporting half-maximal growth.

The following examples illustrates the process of the invention, but the invention is not restricted thereto.

EXAMPLE 1

*Streptomyces griseus* was cultured on a carbohydrate and protein-containing nutrient medium suitable for the preparation of streptomycin. After the fermentation was complete, the broth was acidified to pH 2.8 with sulfuric acid, and a diatomaceous earth filter aid and approximately one percent by weight of an activated carbon were added to the broth, which was then filtered. Aliquot portions of the filter cake were each eluted with 20 milliliters of various different aqueous solvents per gram of wet cake by shaking a portion of the filter cake for ten minutes with the solvent. The pH of the aqueous solvent was adjusted by adding sufficient ammonium hydroxide to neutralize the acid retained on the cake and to produce the final pH as indicated in the table. The suspensions were filtered and the vitamin $B_{12}$ activities of each were determined by the method of W. Shive, J. M. Ravel and R. E. Eakin (J. Am. Chem. Soc., 1948, vol. 70, page 2614). The results are as listed in the table. Since the products of three different fermentations were used and listed in the table, as indicated by the three different lots of charcoal, a direct comparison between the vitamin $B_{12}$ activities in different series is not possible. It will be noted, however, that water alone is a poorer extractant than any of the aqueous solutions of acetone or alcohols.

Table

| Solvent percent and water | Charcoal | pH | Vitamin $B_{12}$ Activity, Half-maximal (m./2) units | |
|---|---|---|---|---|
| | | | per gram charcoal | per mg. solids |
| Ethyl alcohol 50% | Lot 1 | 9.5 | 500 | 7.84 |
| Do | do | 10.5 | 464 | 14.5 |
| Do | do | 11.5 | 404 | 7.05 |
| Water only | Lot 2 | 9.5 | 29.6 | 0.29 |
| Acetone 25% | do | 9.5 | 95 | 1.36 |
| Acetone 40% | do | 9.5 | 184 | 2.5 |
| Acetone 60% | do | 9.5 | 184 | 2.9 |
| Isopropanol 50% | do | 9.5 | 237 | 4.5 |
| Methanol 50% | do | 9.5 | 222 | 4.4 |
| Acetone 40% | Lot 3 | 9.5 | 608 | 15.0 |
| Ethanol 50% | do | 9.5 | 532 | 15.6 |
| Isopropanol 50% | do | 9.5 | 504 | 15.6 |

EXAMPLE 2

Two hundred liters of a carbohydrate and protein-containing nutrient medium were inoculated with *Streptomyces griseus* and incubated at 24 degrees centigrade for about 72 hours. The broth was then acidified to pH 2.8 with sulfuric acid, stirred with 500 grams of adsorbent charcoal for 30 minutes, 4,000 grams of diatomaceous earth filter aid (Celite) added, the suspension filtered and the filter cake washed with 20 liters of water.

The filter cake was washed four times with 25-liter portions of acetone to remove the cycloheximide, which may be recovered from the acetone eluate. The filter cake was then eluted with 24.0 liters of acidulated water at pH 6.0, the water and acetone on the filter cake giving a final concentration of 50 percent acetone. This liquid was circulated over the filter cake several times, the net result being elution with 50 percent acetone at pH 6.0. The eluate, amounting to 40 liters, contained 2,390,000 m./2 units of vitamin $B_{12}$ and a total of 144 grams of solids or a concentration of 16.6 m./2 units per milligram of solids. The filter cake was eluted an additional three times with 32.0, 24.0 and 22 liters of 50 percent aqueous acetone at pH 9.5 and 9.3. The first eluate, 20 liters, contained 2,100,000 m./2 units of vitamin $B_{12}$ and 50.4 grams of solids; the second eluate, 22 liters, contained 1,160,000 m./2 units and 68 grams of solids; the third eluate, 20 liters, contained 480,000 m./2 units and 40.6 grams of solids. The four eluates were combined, the pH adjusted to about 7.0 and the acetone and some water removed under reduced pressure at a temperature of 40 to 45 degrees centigrade. The aqueous concentrate contained 9.75 m./2 units or 19.5 milligammas of vitamin $B_{12}$ per milligram of solids. This concentrate may be used directly for therapeutic purposes, but preferably is subjected to further concentration and purification for this purpose.

The combined filtrate and washings from the filtration of the acidified brew were adjusted to pH 8.0 with sodium hydroxide solution. An inactive precipitate separated which was removed by filtration using a filter aid, and 6,000 grams of activated carbon was added to the filtrate which was then stirred for 30 minutes and filtered. The activated carbon filter cake was washed with water until free of sulfate, the washings being discarded. The washed carbon cake was eluted with one 24-liter portion and three 14-liter portions (total of 66 liters) of five percent aqueous acetone acidified to pH 2.5 with sulfuric acid. The five percent acetone eluates contain the streptomycin, which may be recovered and purified by procedures known to the art. The carbon cake was washed with 16 liters of water made sufficiently alkaline with 98 milliliters of concentrated ammonium hydroxide so that the final pH of the wash water was 6.0, no vitamin $B_{12}$ being found in the wash liquid. The vitamin $B_{12}$ was removed from the carbon cake by eluting with three portions consisting respectively of 28, 14 and 14 liters of 50 percent aqueous acetone adjusted to pH 9.5 with respectively 242 and 100 milliliters of concentrated ammonium hydroxide added to the first two acetone eluates, none being necessary in the third elution. The first aqueous acetone eluate of 14.5 liters contained 381,000 m./2 units of vitamin $B_{12}$ and 197 grams of solids; the second eluate, 14.0 liters, contained 464,000 m./2 units of vitamin $B_{12}$ and 88 grams of solids; the third eluate, 14.0 liters, contained 455,000 m./2 units of vitamin $B_{12}$ and 57.7 grams of solids. The pH of the acetone eluates was adjusted to 6.0–6.5 with hydrochloric acid and the eluates were combined and concentrated under reduced pressure at 40 to 45 degrees centigrade until all of the acetone and a part of the water were removed. The resulting concentrate contained 1,350,000 m./2 units of vitamin $B_{12}$ having a potency of 4.75 m./2 units or 9.5 milligammas of vitamin $B_{12}$ per milligram of solids. This material is of value as a raw material for the preparation of more concentrated therapeutic preparations having vitamin $B_{12}$ activity.

In Example 2, the method of separating streptomycin and cycloheximide prior to separation of the substances possessing vitamin $B_{12}$ activity, has been illustrated. This process of the invention contemplates no changes or modifications of conventional fermentation procedure for the production of streptomycin and cycloheximide. The function of the charcoal or adsorption carbon is not merely that of adsorbing streptomycin or liberated substances having vitamin $B_{12}$ activity that are present in the broth, but also that of removing colored products from the concentrate possessing vitamin $B_{12}$ activity. Approximately one-half to one and one-half percent by weight of adsorptive carbon should be used dependent upon its adsorptive power and the prevailing conditions for which it is to be used.

Since the vitamin $B_{12}$ activity is associated with the mycelium of the organism, and only small proportions thereof are present in the fermentation broth, it is advantageous, after removal of the streptomycin and cycloheximide, to subject the mycelium to a treatment with steam for the purpose of lysing or destroying the cells of the mycelium and thereby liberate substances having vitamin $B_{12}$ activity. This is illustrated in Examples 3 and 4 which follow hereinafter.

EXAMPLE 3—LYSIS OF THE MYCELIUM

To a 30-liter aliquot of a *Streptomyces griseus* culture prepared as described in Example 2, was added 600 grams of a diatomaceous earth filter aid (Celite–545), the suspension was filtered without acidification and the filter cake washed with about 5.0 liters of water.

The wet filter cake, which weighed 3200 grams, was divided into three equal portions of 1066 grams, each portion containing 410,000 milligammas of vitamin $B_{12}$.

Portion 1 was treated with two liters of boiling water for 20 minutes, filtered, and washed with 400 milliliters of water. The filtrate contained 407,000 milligammas of vitamin $B_{12}$ having a purity of 11.6 milligammas per milligram. The residual cake was eluted with 1.0 liter of 60 percent acetone adjusted to pH 9.5 with ammonium hydroxide. There was obtained an additional 23,000 milligammas of vitamin $B_{12}$.

To portion 2 was added 1500 milliliters of acetone and 800 milliliters of water, giving with the water on the cake a concentration of 60 percent acetone. The pH was adjusted to 2.0 with sulfuric acid, the suspension allowed to stand 16 hours and then filtered. The filtrate contained 191,000 milligammas of vitamin $B_{12}$ having a potency of 5.8 milligammas per milligram.

To portion 3, one thousand milliliters of water and 25 milliliters of concentrated sulfuric acid was added, and pH of the suspension being 2.0. The suspension was filtered, and the cake washed with water until a volume of 2.6 liters was obtained. The filtrate contained 169,000 milligammas of vitamin $B_{12}$ having a potency of 4.35 milligammas per milligram.

EXAMPLE 4

Two hundred liters of a carbohydrate and protein-containing nutrient medium was inoculated with *Streptomyces griseus* and incubated at 24 degrees centigrade for about 72 hours, the broth containing a total of 47.5 million milligammas of vitamin $B_{12}$. The broth was acidified to a pH between 5.0 and 6.0 with sulfuric acid, 6,000 grams of a diatomaceous earth filter aid ("Celite") was added, the suspension filtered on a plate and frame filter press and the cake washed with 25 liters of water. The filtrate, which contained practically all of the streptomycin and cycloheximide, was further processed to recover these products.

The mycelial cake, which was practically free of cycloheximide and streptomycin, was treated on the filter press with 30.0 liters of boiling water which was circulated through the press and a heating tank until the temperature of the effluent liquid was between 80 and 95 degrees centigrade, to lyse the mycelium and extract the vitamin $B_{12}$. The cake was then treated with 30, 30 and 18-liter portions of hot water. The combined eluates (volume 78 liters) had a pH of 6.5 and contained 38.0 million milligammas of vitamin $B_{12}$ a recovery of 80 per cent.

The solution was cooled to room temperature, the pH adjusted to 8.6 with saturated sodium hydroxide solution and stirred for 30 minutes with 1900 grams of activated carbon. Five hundred grams of a diatomaceous earth filter aid (Celite) was added to the suspension, which was thereafter filtered and the filtrate discarded. The filter cake was washed with dilute ammonium hydroxide solution (150 milliliters of 28 per cent $NH_4OH$ in 25 liters of water) until the pH of the effluent was between 9.0 and 9.5. The filter cake was then eluted with three 12 and one 10-liter portions of 50 per cent aqueous acetone which has been adjusted to a pH between 9.3 and 9.5 with ammonium hydroxide, at a temperature of 50 to 55 degrees centigrade. The combined eluates (volume 39.0 liters) were concentrated at subatmospheric pressure at a temperature of 50 to 60 degrees centigrade to a volume of 4.4 liters containing 27.1 million milligammas of vitamin $B_{12}$ having a potency of 112 milligammas per milligram.

The concentrated eluates were cooled to 2 degrees centigrade for 16 hours. A precipitate separated which was removed by the addition of 50 grams of a diatomaceous earth filter aid and filtration through a Büchner funnel precoated with filter aid.

The filtrate was extracted four times with 4, 4, 2 and 2-liter portions of chloroform. Emulsions were formed which were broken by freezing to between minus 25 and minus 50 degrees centigrade or by a supercentrifuge. The aqueous residue was heated to 50 degrees centigrade under reduced pressure to remove dissolved chloroform.

The aqueous solution thus obtained contained 90.5 grams of solids which contained 12.3 million milligammas of vitamin $B_{12}$ having a potency of 136 milligammas of vitamin $B_{12}$ per milligram, a recovery of 26 percent of the vitamin $B_{12}$ originally present in the mycelium. This material is of suitable strength and purity for clinical use.

Although the foregoing specification has been directed specifically to the recovery of concentrates containing high proportions of vitamin $B_{12}$ from streptomycin and cycloheximide-producing cultures of the organism *Streptomyces griseus*, our invention may be applied to the recovery of such vitamin $B_{12}$ concentrates from cultures of strains of *Streptomyces griseus* or other organisms of the genus Streptomyces which do not produce streptomycin.

Although the foregoing specification comprises preferred embodiments of the invention, it is to be understood that the invention is not limited thereto, and that modifications and variations may be made therein as suggested to those skilled in the art, without departing from the invention or the scope of the appended claims.

We claim:

1. A process for the preparation of a concentrate having vitamin $B_{12}$ activity from a *Streptomyces griseus* culture containing streptomycin, which comprises: eluting a mycelial cake obtained as a byproduct in the separation of streptomycin from the fermentation broth, which mycelial cake is substantially free from streptomycin and contains substances having vitamin $B_{12}$ activity, with an aqueous solution of an organic solvent of the group consisting of water-miscible alcohols and ketones at a pH within the range from approximately 6.0 to 11.0.

2. A process for the preparation of a concentrate having vitamin $B_{12}$ activity, comprising: culturing a vitamin $B_{12}$-producing organism of the genus Streptomyces on a liquid nutrient medium, separating the mycelium from the nutrient medium, extracting the separated mycelium at a temperature between 50 and 110 degrees centigrade with water having a pH between approximately 4.5 and approximately 9.5, eluting the residual mycelium with a solvent of the group consisting of aqueous solutions of water-miscible alcohols and ketones at a pH within the range from approximately 6.0 to approximately 10.5 and thereafter removing the solvent.

3. A process as defined in claim 2, wherein the solvent is an aqueous solution of acetone.

4. A process as defined in claim 2, wherein the solvent is an aqueous solution of a water-miscible alcohol containing from 40 to 60 percent water.

5. A process as defined in claim 2, wherein the solvent is an aqueous solution of acetone containing from 40 to 60 percent water.

6. A process as defined in claim 2, wherein the pH of the eluting solvent is approximately 9.5.

7. A process for the preparation of a concentrate having vitamin $B_{12}$ activity, comprising: culturing a vitamin $B_{12}$-producing organism of the genus Streptomyces, separating the mycelium from the liquid portion of the culture, extracting the separated mycelium with water at a temperature between approximately 50 and approximately 110 degrees centigrade, removing the mycelium, adsorbing the vitamin $B_{12}$ from the filtrate adjusted to a pH between approximately 8.0 and approximately 9.5 with activated carbon, eluting the carbon cake with an aqueous solution of a member of the group consisting of water-miscible alcohols and ketones at a pH within the range of approximately 6.0 to approximately 11.0, removing the organic solvent, extracting the aqueous solution with chloroform, and thereafter recovering the vitamin $B_{12}$ from the aqueous solution.

8. A process as defined in claim 7, in which the eluting solvent is an aqueous solution of acetone.

9. A process as defined in claim 7 in which the eluting solvent is an aqueous solution of a water-miscible alcohol containing from 40 to 60 percent water.

10. A process as defined in claim 7 in which the eluting solvent is an aqueous solution of acetone containing from 40 to 60 percent water.

11. A process as defined in claim 7 in which the pH of the eluting solvent is between approximately 9.0 and approximately 9.5.

12. A process for the preparation of a concentrate having vitamin $B_{12}$ activity from a culture of a vitamin $B_{12}$-producing organism of the genus Streptomyces, which comprises acidifying the culture and adding thereto approximately 1 per cent by weight/volume of activated carbon, separating the carbon and mycelium from the liquid portion of the filtrate and extracting the vitamin $B_{12}$ from the separated carbon and mycelium with a solvent of the group consisting of aqueous solutions of water-miscible alcohols and ketones at a pH within the range from approximately 6.0 to approximately 11.0.

13. A process for the production of a concentrate having vitamin $B_{12}$ activity, which comprises culturing a vitamin $B_{12}$-producing organism of the genus Streptomyces, treating the culture with adsorbent charcoal, separating the mycelium and charcoal from the liquid portion of the culture, extracting the mycelium and charcoal with acetone until cycloheximide is substantially separated therefrom, and eluting the residual mycelium and charcoal with a 50 per cent aqueous solution of acetone acidified to a pH of approximately 6.0, to recover the vitamin $B_{12}$ and concentrating the eluate thus obtained.

CURTIS E. MEYER.
WILLIAM H. DE VRIES.

REFERENCES CITED

The following references are of record in the file of this patent:

Rickes: Science, vol. 108, page 635, December 3, 1948.

Reynolds: Proceedings of the Society of Experimental Biology and Medicine, vol. 64, January 1947, pages 50 to 54.

Vander Brook: Journal of Biological Chemistry, vol. 165 (1946), pages 463 to 468.

Journal of the American Pharmaceutical Association, Scientific Edition, vol. 34 (1945), pages 276 to 277.

Smith: Nature, vol. 161, April 24, 1948, pages 638, 639.

Emery: Proceedings of the Biochemical Journal in the Biochemical Journal, vol. 40 (1946), page IV.

Rickes: Science, vol. 107, April 16, 1948, pages 396, 397.

Ford: Journal of the American Chemical Society, vol. 70 (1948), page 1223.

Zinsser: Textbook of Bacteriology, 7th ed. (1935), page 950.